(12) United States Patent
Kato et al.

(10) Patent No.: US 9,564,678 B2
(45) Date of Patent: *Feb. 7, 2017

(54) ANTENNA DEVICE AND METHOD OF SETTING RESONANT FREQUENCY OF ANTENNA DEVICE

(75) Inventors: Noboru Kato, Moriyama (JP); Katsumi Taniguchi, Kyoto (JP); Jun Sasaki, Kyoto (JP); Naoki Gochi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,801

(22) Filed: Sep. 6, 2012

(65) Prior Publication Data

US 2013/0234905 A1    Sep. 12, 2013

Related U.S. Application Data

(63) Continuation of application No. 13/272,365, filed on Oct. 13, 2011, which is a continuation of application No. PCT/JP2009/066336, filed on Sep. 18, 2009.

(30) Foreign Application Priority Data

Apr. 21, 2009    (JP) ................... 2009-103358

(51) Int. Cl.
*G06K 19/077*    (2006.01)
*H01Q 1/36*    (2006.01)
(Continued)

(52) U.S. Cl.
CPC ........ *H01Q 1/243* (2013.01); *G06K 19/07779* (2013.01); *H01P 11/00* (2013.01);
(Continued)

(58) Field of Classification Search
CPC .. H01Q 1/2208; H01Q 1/2216; H01Q 1/2225; H01Q 1/2233; H01Q 1/2241; G06K 19/07777; G06K 7/10336; G06K 7/10386; G06K 19/07749; G06K 19/07773
(Continued)

(56) References Cited

U.S. PATENT DOCUMENTS 3,364,564 A    1/1968   Kurtz et al.
4,794,397 A    12/1988  Ohe et al.
(Continued)

FOREIGN PATENT DOCUMENTS

CA        2 279 176 A1    7/1998
DE    10 2006 057 369 A1   6/2008
(Continued)

OTHER PUBLICATIONS

Official Communication issued in corresponding Japanese Patent Application No. 2012-107344, mailed on Sep. 18, 2012.
(Continued)

*Primary Examiner* — Sue A Purvis
*Assistant Examiner* — Amal Patel
(74) *Attorney, Agent, or Firm* — Keating & Bennett, LLP

(57) ABSTRACT

In antenna device, a coil conductor of an antenna coil module and a conductor layer at least partially overlap. A current flows in the conductor layer to block a magnetic field generated by a current flowing in the coil conductor. A current flows along the periphery of a slit and around the periphery of the conductor layer due to a cut-edge effect. Since magnetic flux does not pass through the conductor layer, magnetic flux attempts to bypass the conductor layer along a path in which the conductor opening of the conductor layer is on the inside and the outer edge of the conductor layer is on the outside. As a result, the magnetic flux generates large loops that link the inside and the outside of
(Continued)

a coil conductor of an antenna on a reader/writer side to couple an antenna device and the antenna on the reader/writer side.

15 Claims, 6 Drawing Sheets

(51) Int. Cl.
| | | |
|---|---|---|
| *H01Q 7/00* | (2006.01) | |
| *H01Q 1/24* | (2006.01) | |
| *H01Q 1/38* | (2006.01) | |
| *H01Q 7/04* | (2006.01) | |
| *H04B 5/00* | (2006.01) | |
| *H01P 11/00* | (2006.01) | |
| *H01Q 1/22* | (2006.01) | |
| *H01Q 7/06* | (2006.01) | |
| *H01Q 1/48* | (2006.01) | |
| *H01Q 1/52* | (2006.01) | |
| *H01Q 19/06* | (2006.01) | |
| *H01Q 19/02* | (2006.01) | |

(52) U.S. Cl.
CPC ............ *H01P 11/001* (2013.01); *H01Q 1/22* (2013.01); *H01Q 1/2225* (2013.01); *H01Q 1/36* (2013.01); *H01Q 1/38* (2013.01); *H01Q 1/48* (2013.01); *H01Q 1/52* (2013.01); *H01Q 7/00* (2013.01); *H01Q 7/04* (2013.01); *H01Q 7/06* (2013.01); *H01Q 19/02* (2013.01); *H01Q 19/062* (2013.01); *H04B 5/0081* (2013.01); *Y10T 29/49016* (2015.01)

(58) Field of Classification Search
USPC ........ 343/788, 895, 867–868, 870, 741, 842
See application file for complete search history.

(56) References Cited

U.S. PATENT DOCUMENTS

| | | | |
|---|---|---|---|
| 5,232,765 A | 8/1993 | Yano et al. | |
| 5,253,969 A | 10/1993 | Richert | |
| 5,337,063 A | 8/1994 | Takahira | |
| 5,374,937 A | 12/1994 | Tsunekawa et al. | |
| 5,399,060 A | 3/1995 | Richert | |
| 5,491,483 A | 2/1996 | D'Hont | |
| 5,528,222 A | 6/1996 | Moskowitz et al. | |
| 5,757,074 A | 5/1998 | Matloubian et al. | |
| 5,854,480 A | 12/1998 | Noto | |
| 5,903,239 A | 5/1999 | Takahashi et al. | |
| 5,936,150 A | 8/1999 | Kobrin et al. | |
| 5,955,723 A | 9/1999 | Reiner | |
| 5,995,006 A | 11/1999 | Walsh | |
| 6,104,311 A | 8/2000 | Lastinger | |
| 6,107,920 A | 8/2000 | Eberhardt et al. | |
| 6,172,608 B1 | 1/2001 | Cole | |
| 6,181,287 B1 | 1/2001 | Beigel | |
| 6,190,942 B1 | 2/2001 | Wilm et al. | |
| 6,243,045 B1 | 6/2001 | Ishibashi | |
| 6,249,258 B1 | 6/2001 | Bloch et al. | |
| 6,259,369 B1 | 7/2001 | Monico | |
| 6,271,803 B1 | 8/2001 | Watanabe et al. | |
| 6,335,686 B1 | 1/2002 | Goff et al. | |
| 6,362,784 B1 | 3/2002 | Kane et al. | |
| 6,367,143 B1 | 4/2002 | Sugimura | |
| 6,378,774 B1 | 4/2002 | Emori et al. | |
| 6,406,990 B1 | 6/2002 | Kawai | |
| 6,448,874 B1 | 9/2002 | Shiino et al. | |
| 6,452,563 B1* | 9/2002 | Porte ............................ | 343/866 |
| 6,462,716 B1 | 10/2002 | Kushihi | |
| 6,542,050 B1 | 4/2003 | Arai et al. | |
| 6,600,459 B2 | 7/2003 | Yokoshima et al. | |
| 6,634,564 B2 | 10/2003 | Kuramochi | |
| 6,664,645 B2 | 12/2003 | Kawai | |
| 6,763,254 B2 | 7/2004 | Nishikawa | |
| 6,812,707 B2 | 11/2004 | Yonezawa et al. | |
| 6,828,881 B2 | 12/2004 | Mizutani et al. | |
| 6,837,438 B1 | 1/2005 | Takasugi et al. | |
| 6,861,731 B2 | 3/2005 | Buijsman et al. | |
| 6,927,738 B2 | 8/2005 | Senba et al. | |
| 6,956,481 B1 | 10/2005 | Cole | |
| 6,963,729 B2 | 11/2005 | Uozumi | |
| 7,050,007 B2* | 5/2006 | Akiho et al. .................. | 343/702 |
| 7,088,249 B2 | 8/2006 | Senba et al. | |
| 7,088,307 B2 | 8/2006 | Imaizumi | |
| 7,112,952 B2 | 9/2006 | Arai et al. | |
| 7,119,693 B1 | 10/2006 | Devilbiss | |
| 7,129,834 B2 | 10/2006 | Naruse et al. | |
| 7,183,987 B2* | 2/2007 | Akiho et al. .................. | 343/742 |
| 7,248,221 B2 | 7/2007 | Kai et al. | |
| 7,250,910 B2 | 7/2007 | Yoshikawa et al. | |
| 7,276,929 B2 | 10/2007 | Arai et al. | |
| 7,317,396 B2 | 1/2008 | Ujino | |
| 7,405,664 B2 | 7/2008 | Sakama et al. | |
| 7,934,646 B2* | 5/2011 | Yang .............................. | 235/381 |
| 2001/0011012 A1 | 8/2001 | Hino et al. | |
| 2002/0011967 A1 | 1/2002 | Goff et al. | |
| 2002/0015002 A1 | 2/2002 | Yasukawa et al. | |
| 2002/0044092 A1 | 4/2002 | Kushihi | |
| 2002/0067316 A1 | 6/2002 | Yokoshima et al. | |
| 2002/0093457 A1 | 7/2002 | Hamada et al. | |
| 2002/0186004 A1 | 12/2002 | Prazeres da Costa et al. | |
| 2003/0006901 A1 | 1/2003 | Kim et al. | |
| 2003/0020661 A1 | 1/2003 | Sato | |
| 2003/0045324 A1 | 3/2003 | Nagumo et al. | |
| 2003/0169153 A1 | 9/2003 | Muller | |
| 2003/0206095 A1 | 11/2003 | Chaloner et al. | |
| 2004/0001027 A1 | 1/2004 | Killen et al. | |
| 2004/0026519 A1 | 2/2004 | Usami et al. | |
| 2004/0056823 A1 | 3/2004 | Zuk et al. | |
| 2004/0066617 A1 | 4/2004 | Hirabayashi et al. | |
| 2004/0217915 A1 | 11/2004 | Imaizumi | |
| 2004/0219956 A1 | 11/2004 | Iwai et al. | |
| 2004/0227673 A1 | 11/2004 | Iwai et al. | |
| 2004/0252064 A1 | 12/2004 | Yuanzhu | |
| 2005/0001031 A1 | 1/2005 | Akiho et al. | |
| 2005/0092836 A1 | 5/2005 | Kudo | |
| 2005/0099337 A1 | 5/2005 | Takei et al. | |
| 2005/0125093 A1 | 6/2005 | Kikuchi et al. | |
| 2005/0133605 A1 | 6/2005 | Koyama et al. | |
| 2005/0134460 A1 | 6/2005 | Usami | |
| 2005/0134506 A1 | 6/2005 | Egbert | |
| 2005/0138798 A1 | 6/2005 | Sakama et al. | |
| 2005/0140512 A1 | 6/2005 | Sakama et al. | |
| 2005/0232412 A1 | 10/2005 | Ichihara et al. | |
| 2005/0236623 A1 | 10/2005 | Takechi et al. | |
| 2005/0253726 A1 | 11/2005 | Yoshida et al. | |
| 2005/0275539 A1 | 12/2005 | Sakama et al. | |
| 2006/0001138 A1 | 1/2006 | Sakama et al. | |
| 2006/0032926 A1 | 2/2006 | Baba et al. | |
| 2006/0044192 A1 | 3/2006 | Egbert | |
| 2006/0055531 A1 | 3/2006 | Cook et al. | |
| 2006/0055601 A1 | 3/2006 | Kameda et al. | |
| 2006/0071084 A1 | 4/2006 | Detig et al. | |
| 2006/0109185 A1 | 5/2006 | Iwai et al. | |
| 2006/0114159 A1 | 6/2006 | Yoshikawa et al. | |
| 2006/0145872 A1 | 7/2006 | Tanaka et al. | |
| 2006/0158380 A1 | 7/2006 | Son et al. | |
| 2006/0170606 A1 | 8/2006 | Yamagajo et al. | |
| 2006/0208900 A1 | 9/2006 | Tavassoli Hozouri | |
| 2006/0214801 A1 | 9/2006 | Murofushi et al. | |
| 2006/0220871 A1 | 10/2006 | Baba et al. | |
| 2006/0244568 A1 | 11/2006 | Tong et al. | |
| 2006/0244676 A1 | 11/2006 | Uesaka | |
| 2006/0267138 A1 | 11/2006 | Kobayashi | |
| 2007/0004028 A1 | 1/2007 | Lair et al. | |
| 2007/0015549 A1 | 1/2007 | Hernandez et al. | |
| 2007/0018893 A1 | 1/2007 | Kai et al. | |
| 2007/0040028 A1 | 2/2007 | Kawamata | |
| 2007/0052613 A1 | 3/2007 | Gallschuetz et al. | |
| 2007/0057854 A1 | 3/2007 | Oodachi et al. | |
| 2007/0069037 A1 | 3/2007 | Kawai | |
| 2007/0132591 A1 | 6/2007 | Khatri | |

(56) References Cited

U.S. PATENT DOCUMENTS

| | | |
|---|---|---|
| 2007/0164414 A1 | 7/2007 | Dokai et al. |
| 2007/0200705 A1 | 8/2007 | Yamagajo et al. |
| 2007/0200782 A1 | 8/2007 | Hayama et al. |
| 2007/0229276 A1 | 10/2007 | Yamagajo et al. |
| 2007/0247387 A1 | 10/2007 | Kubo et al. |
| 2007/0252700 A1 | 11/2007 | Ishihara et al. |
| 2007/0252703 A1 | 11/2007 | Kato et al. |
| 2007/0252763 A1 | 11/2007 | Martin |
| 2007/0252770 A1 | 11/2007 | Kai et al. |
| 2007/0285335 A1 | 12/2007 | Bungo et al. |
| 2007/0290928 A1 | 12/2007 | Chang et al. |
| 2008/0024156 A1 | 1/2008 | Arai et al. |
| 2008/0068132 A1 | 3/2008 | Kayanakis et al. |
| 2008/0070003 A1 | 3/2008 | Nakatani et al. |
| 2008/0074268 A1 | 3/2008 | Shafer |
| 2008/0087990 A1 | 4/2008 | Kato et al. |
| 2008/0111695 A1 | 5/2008 | Yamagajo et al. |
| 2008/0129606 A1 | 6/2008 | Yanagisawa et al. |
| 2008/0143630 A1 | 6/2008 | Kato et al. |
| 2008/0169905 A1 | 7/2008 | Slatter |
| 2008/0184281 A1 | 7/2008 | Ashizaki et al. |
| 2008/0272885 A1 | 11/2008 | Atherton |
| 2009/0002130 A1 | 1/2009 | Kato |
| 2009/0009007 A1 | 1/2009 | Kato et al. |
| 2009/0021352 A1 | 1/2009 | Kataya et al. |
| 2009/0021446 A1 | 1/2009 | Kataya et al. |
| 2009/0065594 A1 | 3/2009 | Kato et al. |
| 2009/0066466 A1 | 3/2009 | Arimura |
| 2009/0080296 A1 | 3/2009 | Dokai et al. |
| 2009/0096696 A1 | 4/2009 | Joyce, Jr. et al. |
| 2009/0109034 A1 | 4/2009 | Chen et al. |
| 2009/0109102 A1 | 4/2009 | Dokai et al. |
| 2009/0134979 A1 | 5/2009 | Tsukamoto et al. |
| 2009/0140947 A1 | 6/2009 | Sasagawa et al. |
| 2009/0160719 A1 | 6/2009 | Kato et al. |
| 2009/0201116 A1 | 8/2009 | Orihara |
| 2009/0224061 A1 | 9/2009 | Kato et al. |
| 2009/0231106 A1 | 9/2009 | Okamura |
| 2009/0262041 A1 | 10/2009 | Ikemoto et al. |
| 2009/0266900 A1 | 10/2009 | Ikemoto et al. |
| 2009/0278687 A1 | 11/2009 | Kato |
| 2009/0284220 A1 | 11/2009 | Toncich et al. |
| 2009/0321527 A1 | 12/2009 | Kato et al. |
| 2010/0103058 A1 | 4/2010 | Kato et al. |
| 2010/0182210 A1 | 7/2010 | Ryou et al. |
| 2010/0283694 A1 | 11/2010 | Kato |
| 2010/0308118 A1 | 12/2010 | Kataya et al. |
| 2011/0031320 A1 | 2/2011 | Kato et al. |
| 2011/0063184 A1 | 3/2011 | Furumura et al. |
| 2011/0186641 A1 | 8/2011 | Kato et al. |
| 2011/0253795 A1 | 10/2011 | Kato |

FOREIGN PATENT DOCUMENTS

| | | |
|---|---|---|
| EP | 0 694 874 A2 | 1/1996 |
| EP | 0 848 448 A2 | 6/1998 |
| EP | 0 948 083 A2 | 10/1999 |
| EP | 0 977 145 A2 | 2/2000 |
| EP | 1 010 543 A1 | 6/2000 |
| EP | 1 085 480 A1 | 3/2001 |
| EP | 1 160 915 A2 | 12/2001 |
| EP | 1 170 795 A2 | 1/2002 |
| EP | 1 193 793 A2 | 4/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1 445 730 A1 | 8/2004 |
| EP | 1 484 816 A1 | 12/2004 |
| EP | 1 547 753 A1 | 6/2005 |
| EP | 1 548 872 A1 | 6/2005 |
| EP | 1 626 364 A2 | 2/2006 |
| EP | 1 701 296 A1 | 9/2006 |
| EP | 1 703 589 A1 | 9/2006 |
| EP | 1 742 296 A1 | 1/2007 |
| EP | 1 744 398 A1 | 1/2007 |
| EP | 1 840 802 A1 | 10/2007 |
| EP | 1 841 005 A1 | 10/2007 |
| EP | 1 865 574 A1 | 12/2007 |
| EP | 1 887 652 A1 | 2/2008 |
| EP | 1 976 056 A1 | 10/2008 |
| EP | 1 988 491 A1 | 11/2008 |
| EP | 1 988 601 A1 | 11/2008 |
| EP | 1 993 170 A1 | 11/2008 |
| EP | 2 009 738 A1 | 12/2008 |
| EP | 2 012 258 A1 | 1/2009 |
| EP | 2 023 275 A1 | 2/2009 |
| EP | 2 096 709 A1 | 9/2009 |
| EP | 2 148 449 A1 | 1/2010 |
| EP | 2 166 617 A1 | 3/2010 |
| EP | 2 251 934 A1 | 11/2010 |
| EP | 2 256 861 A1 | 12/2010 |
| EP | 2 330 684 A1 | 6/2011 |
| FR | 2 787 640 A1 | 6/2000 |
| GB | 2 305 075 A | 3/1997 |
| GB | 2461443 | 1/2010 |
| JP | 50-143451 A | 11/1975 |
| JP | 61-284102 A | 12/1986 |
| JP | 62-127140 U | 8/1987 |
| JP | 01-212035 A | 8/1989 |
| JP | 02-164105 A | 6/1990 |
| JP | 02-256208 A | 10/1990 |
| JP | 3-171385 A | 7/1991 |
| JP | 03-503467 A | 8/1991 |
| JP | 03-262313 A | 11/1991 |
| JP | 04-150011 A | 5/1992 |
| JP | 04-167500 A | 6/1992 |
| JP | 04-096814 U | 8/1992 |
| JP | 04-101168 U | 9/1992 |
| JP | 04-134807 U | 12/1992 |
| JP | 05-226926 A | 9/1993 |
| JP | 05-327331 A | 12/1993 |
| JP | 6-53733 A | 2/1994 |
| JP | 06-077729 A | 3/1994 |
| JP | 06-029215 U | 4/1994 |
| JP | 06-177635 A | 6/1994 |
| JP | 6-260949 A | 9/1994 |
| JP | 07-183836 A | 7/1995 |
| JP | 08-055725 A | 2/1996 |
| JP | 08-056113 A | 2/1996 |
| JP | 8-87580 A | 4/1996 |
| JP | 08-88586 A | 4/1996 |
| JP | 08-088586 A | 4/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 9-93029 A | 4/1997 |
| JP | 09-093029 A | 4/1997 |
| JP | 09-245381 A | 9/1997 |
| JP | 09-252217 A | 9/1997 |
| JP | 09-270623 A | 10/1997 |
| JP | 09-284038 A | 10/1997 |
| JP | 09-294374 A | 11/1997 |
| JP | 9-512367 A | 12/1997 |
| JP | 10-69533 A | 3/1998 |
| JP | 10-069533 A | 3/1998 |
| JP | 10-084406 A | 3/1998 |
| JP | 10-505466 A | 5/1998 |
| JP | 10-171954 A | 6/1998 |
| JP | 10-173427 A | 6/1998 |
| JP | 10-193849 A | 7/1998 |
| JP | 10-193851 A | 7/1998 |
| JP | 10-242742 A | 9/1998 |
| JP | 10-293828 A | 11/1998 |
| JP | 10-334203 A | 12/1998 |
| JP | 11-025244 A | 1/1999 |
| JP | 11-025245 A | 1/1999 |
| JP | 11025244 A * | 1/1999 |
| JP | 11-039441 A | 2/1999 |

(56) References Cited

FOREIGN PATENT DOCUMENTS

| | | |
|---|---|---|
| JP | 11-075329 A | 3/1999 |
| JP | 11-085937 A | 3/1999 |
| JP | 11-88241 A | 3/1999 |
| JP | 11-102424 A | 4/1999 |
| JP | 11-103209 A | 4/1999 |
| JP | 11-149536 A | 6/1999 |
| JP | 11-149537 A | 6/1999 |
| JP | 11-149538 A | 6/1999 |
| JP | 11-175678 A | 7/1999 |
| JP | 11-219420 A | 8/1999 |
| JP | 11-220319 A | 8/1999 |
| JP | 11-238103 A | 8/1999 |
| JP | 11238103 A * | 8/1999 |
| JP | 11-282993 A | 10/1999 |
| JP | 11-328352 A | 11/1999 |
| JP | 11-331014 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2000-048152 A | 2/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-209013 A | 7/2000 |
| JP | 2000-222540 A | 8/2000 |
| JP | 2000-510271 A | 8/2000 |
| JP | 2000-242754 A | 9/2000 |
| JP | 2000-243797 A | 9/2000 |
| JP | 2000-251049 A | 9/2000 |
| JP | 2000-261230 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 2000-349680 A | 12/2000 |
| JP | 2001-10264 A | 1/2001 |
| JP | 2001-028036 A | 1/2001 |
| JP | 2001-043340 A | 2/2001 |
| JP | 3075400 U | 2/2001 |
| JP | 2001-66990 A | 3/2001 |
| JP | 2001-76111 A | 3/2001 |
| JP | 2001-084463 A | 3/2001 |
| JP | 2001-101369 A | 4/2001 |
| JP | 2001-505682 A | 4/2001 |
| JP | 2001-168628 A | 6/2001 |
| JP | 2001-188890 A | 7/2001 |
| JP | 2001-209767 A | 8/2001 |
| JP | 2001-240046 A | 9/2001 |
| JP | 2001-240217 A | 9/2001 |
| JP | 2001-256457 A | 9/2001 |
| JP | 2001-257292 A | 9/2001 |
| JP | 2001-514777 A | 9/2001 |
| JP | 2001-291181 A | 10/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351083 A | 12/2001 |
| JP | 2001-351084 A | 12/2001 |
| JP | 2001-352176 A | 12/2001 |
| JP | 2001-358527 A | 12/2001 |
| JP | 2002-024776 A | 1/2002 |
| JP | 2002-026513 A | 1/2002 |
| JP | 2002-32731 A | 1/2002 |
| JP | 2002-042076 A | 2/2002 |
| JP | 2002-042083 A | 2/2002 |
| JP | 2002-063557 A | 2/2002 |
| JP | 2002-505645 A | 2/2002 |
| JP | 2002-76750 A | 3/2002 |
| JP | 2002-076750 A | 3/2002 |
| JP | 2002-111363 A | 4/2002 |
| JP | 2002-143826 A | 5/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-175920 A | 6/2002 |
| JP | 2002-183676 A | 6/2002 |
| JP | 2002-183690 A | 6/2002 |
| JP | 2002-185358 A | 6/2002 |
| JP | 2002-204117 A | 7/2002 |
| JP | 2002-521757 A | 7/2002 |
| JP | 2002-522849 A | 7/2002 |
| JP | 2002-222398 A | 8/2002 |
| JP | 2002-230128 A | 8/2002 |
| JP | 2002-232221 A | 8/2002 |
| JP | 2002-246828 A | 8/2002 |
| JP | 2002-252117 A | 9/2002 |
| JP | 2002-259934 A | 9/2002 |
| JP | 2002-280821 A | 9/2002 |
| JP | 2002-290130 A | 10/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-325013 A | 11/2002 |
| JP | 2002-344225 A | 11/2002 |
| JP | 2002344225 A * | 11/2002 |
| JP | 2002-362613 A | 12/2002 |
| JP | 2002-366917 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-022912 A | 1/2003 |
| JP | 2003-026177 A | 1/2003 |
| JP | 2003-030612 A | 1/2003 |
| JP | 2003-037861 A | 2/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099184 A | 4/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-139866 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |

(56) References Cited

FOREIGN PATENT DOCUMENTS

| | | |
|---|---|---|
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-308363 A | 10/2003 |
| JP | 2003-309418 A | 10/2003 |
| JP | 2003-317055 A | 11/2003 |
| JP | 2003-317060 A | 11/2003 |
| JP | 2003-331246 A | 11/2003 |
| JP | 2003-332820 A | 11/2003 |
| JP | 2003-536302 A | 12/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-096618 A | 3/2004 |
| JP | 2004-506905 A | 3/2004 |
| JP | 2004-104344 A | 4/2004 |
| JP | 2004-121412 A | 4/2004 |
| JP | 2004-126750 A | 4/2004 |
| JP | 2004-127230 A | 4/2004 |
| JP | 2004-140513 A | 5/2004 |
| JP | 2004-145449 A | 5/2004 |
| JP | 2004-163134 A | 6/2004 |
| JP | 2004-166176 A | 6/2004 |
| JP | 2004-213582 A | 7/2004 |
| JP | 2004-519916 A | 7/2004 |
| JP | 2004/070879 A | 8/2004 |
| JP | 2004-234595 A | 8/2004 |
| JP | 2004-253858 A | 9/2004 |
| JP | 2004-527864 A | 9/2004 |
| JP | 2004-280390 A | 10/2004 |
| JP | 2004-282403 A | 10/2004 |
| JP | 2004-287767 A | 10/2004 |
| JP | 2004-295297 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-5866 A | 1/2005 |
| JP | 2005-18156 A | 1/2005 |
| JP | 2005-033461 A | 2/2005 |
| JP | 2005-050581 A | 2/2005 |
| JP | 2005-064799 A | 3/2005 |
| JP | 2005-124061 A | 5/2005 |
| JP | 2005-128592 A | 5/2005 |
| JP | 2005-129019 A | 5/2005 |
| JP | 2005-134942 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-192124 A | 7/2005 |
| JP | 2005-202943 A | 7/2005 |
| JP | 2005-204038 A | 7/2005 |
| JP | 2005204038 A * | 7/2005 |
| JP | 2005-210223 A | 8/2005 |
| JP | 2005-210676 A | 8/2005 |
| JP | 2005-210680 A | 8/2005 |
| JP | 2005-217822 A | 8/2005 |
| JP | 2005-229474 A | 8/2005 |
| JP | 2005-236339 A | 9/2005 |
| JP | 2005-244778 A | 9/2005 |
| JP | 2005-252853 A | 9/2005 |
| JP | 2005-269537 A | 9/2005 |
| JP | 2005-275870 A | 10/2005 |
| JP | 2005-277579 A | 10/2005 |
| JP | 2005-284352 A | 10/2005 |
| JP | 2005-284455 A | 10/2005 |
| JP | 2005-293537 A | 10/2005 |
| JP | 2005-295135 A | 10/2005 |
| JP | 2005-306696 A | 11/2005 |
| JP | 2005-311205 A | 11/2005 |
| JP | 2005-321305 A | 11/2005 |
| JP | 2005-322119 A | 11/2005 |
| JP | 2005-327622 A | 11/2005 |
| JP | 2005-328259 A | 11/2005 |
| JP | 2005-333244 A | 12/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-13976 A | 1/2006 |
| JP | 2006-013976 A | 1/2006 |
| JP | 2006-025390 A | 1/2006 |
| JP | 2006-031766 A | 2/2006 |
| JP | 2006-033312 A | 2/2006 |
| JP | 2006-39902 A | 2/2006 |
| JP | 2006-039947 A | 2/2006 |
| JP | 2006-42059 A | 2/2006 |
| JP | 2006-42097 A | 2/2006 |
| JP | 2006-050200 A | 2/2006 |
| JP | 2006-053833 A | 2/2006 |
| JP | 2006-67479 A | 3/2006 |
| JP | 2006-72706 A | 3/2006 |
| JP | 2006-074348 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-238282 A | 9/2006 |
| JP | 2006-246372 A | 9/2006 |
| JP | 2006-270212 A | 10/2006 |
| JP | 2006-270681 A | 10/2006 |
| JP | 2006-270766 A | 10/2006 |
| JP | 2006-285911 A | 10/2006 |
| JP | 2006-287659 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-13120 A | 1/2007 |
| JP | 2007-013120 A | 1/2007 |
| JP | 2007-18067 A | 1/2007 |
| JP | 2007-019905 A | 1/2007 |
| JP | 2007-28002 A | 2/2007 |
| JP | 2007-040702 A | 2/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096655 A | 4/2007 |
| JP | 2007-096768 A | 4/2007 |
| JP | 2007-102348 A | 4/2007 |

(56) References Cited

FOREIGN PATENT DOCUMENTS

| JP | 2007-116347 A | 5/2007 |
|---|---|---|
| JP | 2007-122542 A | 5/2007 |
| JP | 2007-149757 A | 6/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-166133 A | 6/2007 |
| JP | 3975918 B2 | 6/2007 |
| JP | 2007-172369 A | 7/2007 |
| JP | 2007-172527 A | 7/2007 |
| JP | 2007-199993 A | 8/2007 |
| JP | 2007-524942 A | 8/2007 |
| JP | 2007-228254 A | 9/2007 |
| JP | 2007-228325 A | 9/2007 |
| JP | 2007-228437 A | 9/2007 |
| JP | 2007-233597 A | 9/2007 |
| JP | 2007-241789 A | 9/2007 |
| JP | 2007-249620 A | 9/2007 |
| JP | 2007-266999 A | 10/2007 |
| JP | 2007-272264 A | 10/2007 |
| JP | 2007-279782 A | 10/2007 |
| JP | 2007-287128 A | 11/2007 |
| JP | 2007-295177 A | 11/2007 |
| JP | 2007-295395 A | 11/2007 |
| JP | 2007-295557 A | 11/2007 |
| JP | 2007-312350 A | 11/2007 |
| JP | 2007-317009 A | 12/2007 |
| JP | 2007-324865 A | 12/2007 |
| JP | 2008-033716 A | 2/2008 |
| JP | 2008-042910 A | 2/2008 |
| JP | 2008-72243 A | 3/2008 |
| JP | 2008-083867 A | 4/2008 |
| JP | 2008-092131 A | 4/2008 |
| JP | 2008-097426 A | 4/2008 |
| JP | 2008-098993 A | 4/2008 |
| JP | 4069958 B2 | 4/2008 |
| JP | 2008-103691 A | 5/2008 |
| JP | 2008-107947 A | 5/2008 |
| JP | 2008-513888 A | 5/2008 |
| JP | 2008-148345 A | 6/2008 |
| JP | 2008-519347 A | 6/2008 |
| JP | 2008-160821 A | 7/2008 |
| JP | 2008-160874 A | 7/2008 |
| JP | 2008-167190 A | 7/2008 |
| JP | 2008-182438 A | 8/2008 |
| JP | 2008-197714 A | 8/2008 |
| JP | 2008-535372 A | 8/2008 |
| JP | 2008-207875 A | 9/2008 |
| JP | 2008-211572 A | 9/2008 |
| JP | 2008-217406 A | 9/2008 |
| JP | 2008-226099 A | 9/2008 |
| JP | 2008-252517 A | 10/2008 |
| JP | 2008-288915 A | 11/2008 |
| JP | 2008-294491 A | 12/2008 |
| JP | 2009-017284 A | 1/2009 |
| JP | 2009-021970 A | 1/2009 |
| JP | 2009-25870 A | 2/2009 |
| JP | 2009-27291 A | 2/2009 |
| JP | 2009-027291 A | 2/2009 |
| JP | 2009-037413 A | 2/2009 |
| JP | 2009-044647 A | 2/2009 |
| JP | 2009-044715 A | 2/2009 |
| JP | 3148168 U | 2/2009 |
| JP | 2009-065426 A | 3/2009 |
| JP | 2009-110144 A | 5/2009 |
| JP | 2009-111986 A | 5/2009 |
| JP | 2009-130896 A | 6/2009 |
| JP | 2009-135166 A | 6/2009 |
| JP | 2009-524363 A | 6/2009 |
| JP | 2009-153166 A | 7/2009 |
| JP | 4301346 B2 | 7/2009 |
| JP | 2009-181246 A | 8/2009 |
| JP | 2009-182630 A | 8/2009 |
| JP | 2009-213169 A | 9/2009 |
| JP | 2009-213171 A | 9/2009 |
| JP | 2009-260758 A | 11/2009 |
| JP | 2009-284182 A | 12/2009 |
| JP | 2010-009196 A | 1/2010 |
| JP | 2010-015342 A | 1/2010 |
| JP | 2010-504598 A | 2/2010 |
| JP | 2010-050844 A | 3/2010 |
| JP | 2010-051017 A | 3/2010 |
| JP | 2010-081571 | 4/2010 |
| JP | 4535209 B2 | 9/2010 |
| JP | 2011-015395 A | 1/2011 |
| JP | 4609604 B2 | 1/2011 |
| JP | 2011-205384 A | 10/2011 |
| JP | 2012-033021 A | 2/2012 |
| NL | 9100176 A | 3/1992 |
| NL | 9100347 A | 3/1992 |
| WO | 89/07347 A1 | 8/1989 |
| WO | 98/33142 A1 | 7/1998 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A2 | 4/2004 |
| WO | 2004/070879 A | 8/2004 |
| WO | 2004/072892 A2 | 8/2004 |
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/049068 A1 | 5/2006 |
| WO | 2006/114821 A1 | 11/2006 |
| WO | 2007/013168 A1 | 2/2007 |
| WO | 2007/083574 A1 | 7/2007 |
| WO | 2007/083575 A1 | 7/2007 |
| WO | 2007/086130 A1 | 8/2007 |
| WO | 2007/094494 A1 | 8/2007 |
| WO | 2007/097385 A1 | 8/2007 |
| WO | 2007/099602 A1 | 9/2007 |
| WO | 2007/100092 A1 | 9/2007 |
| WO | 2007/102360 A1 | 9/2007 |
| WO | 2007/105348 A1 | 9/2007 |
| WO | 2007/119310 A1 | 10/2007 |
| WO | 2007/125683 A1 | 11/2007 |
| WO | 2007/132094 A1 | 11/2007 |
| WO | 2007/138857 A1 | 12/2007 |
| WO | 2008/001561 A1 | 1/2008 |
| WO | 2008/007606 A | 1/2008 |
| WO | 2008/081699 A1 | 7/2008 |
| WO | 2008/126458 A1 | 10/2008 |
| WO | 2008/133018 A1 | 11/2008 |
| WO | 2008/140037 A1 | 11/2008 |
| WO | 2008/142957 A1 | 11/2008 |
| WO | 2009/008296 A1 | 1/2009 |
| WO | 2009/011144 A1 | 1/2009 |
| WO | 2009/011154 A1 | 1/2009 |
| WO | 2009/011376 A1 | 1/2009 |
| WO | 2009/011400 A1 | 1/2009 |
| WO | 2009/011423 A1 | 1/2009 |
| WO | 2009/048767 A1 | 4/2009 |
| WO | 2009/081719 A1 | 7/2009 |
| WO | 2009/110381 A1 | 9/2009 |
| WO | 2009/119548 A1 | 10/2009 |
| WO | 2009/128437 A1 | 10/2009 |
| WO | 2009/140220 A1 | 11/2009 |
| WO | 2009/142114 A1 | 11/2009 |
| WO | 2010/026939 A1 | 3/2010 |
| WO | 2010/050361 A1 | 5/2010 |
| WO | 2010/079830 A1 | 7/2010 |
| WO | 2010/119854 A1 | 10/2010 |
| WO | 2011/062274 A1 | 5/2011 |

OTHER PUBLICATIONS

Official Communication issued in corresponding Japanese Patent Application No. 2012-034665, mailed on Sep. 25, 2012.

(56) References Cited

OTHER PUBLICATIONS

Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., Ltd, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Dokai et al.: "Wireless IC Device"; U.S. Appl. No. 13/099,392, filed May 3, 2011.
Kato et al.: "Radio Frequency IC Device"; U.S. Appl. No. 13/163,803, filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official communication issued in counterpart International Application No. PCT/JP2008/071502, mailed Feb. 24, 2009.

Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.:"Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official Communication issued in International Patent Application No. PCT/JP2011/068110, mailed on Sep. 20, 2011.
Dokai et al.: "Antenna and Wireless Communication Device"; U.S. Appl. No. 13/613,021, filed Sep. 13, 2012.
Takeoka et al.: "Printed Wiring Board and Wireless Communication System"; U.S. Appl. No. 13/616,140, filed Sep. 14, 2012.
Dokai: "Wireless IC Device, Wireless IC Module and Method of Manufacturing Wireless IC Module"; U.S. Appl. No. 13/688,287, filed Nov. 29, 2012.
Official Communication issued in International Patent Application No. PCT/JP2011/067127, mailed on Oct. 18, 2011.
Kato et al.: "Wireless Communication Device and Metal Article"; U.S. Appl. No. 13/691,996, filed Dec. 3, 2012.
Yosui: "Antenna Apparatus and Communication Terminal Instrument"; U.S. Appl. No. 13/706,409, filed Dec. 6, 2012.
Official Communication issued in International Patent Application No. PCT/JP2011/071795, mailed on Dec. 27, 2011.
Dokai et al.: "Wireless IC Device"; U.S. Appl. No. 13/738,143, filed Jan. 10, 2013.
Official Communication issued in International Patent Application No. PCT/JP2011/074009, mailed on Dec. 20, 2011.
Kato et al.: "Electromagnetic-Coupling-Module-Attached Article"; U.S. Appl. No. 13/754,972, filed Jan. 31, 2013.
Kimura et al.: "Electrical Product"; U.S. Appl. No. 13/757,991, filed Feb. 4, 2013.
Nakano et al.: "Communication Terminal Device"; U.S. Appl. No. 13/760,196, filed Feb. 6, 2013.
Official Communication issued in International Patent Application No. PCT/JP2011/073054, mailed on Dec. 20, 2011.
Official Communication issued in International Patent Application No. PCT/JP2011/073490, mailed on Jan. 10, 2012.
Kato et al.: "Antenna Device and Communication Terminal Apparatus"; U.S. Appl. No. 13/761,195, filed Feb. 7, 2013.
Kato et al.: "Antenna Device and Mobile Communication Terminal"; U.S. Appl. No. 13/767,960, filed Feb. 15, 2013.
Official Communication issued in International Patent Application No. PCT/JP2012/058884, mailed on Jun. 12, 2012.
Dokai et al.: "Wireless Communication Device"; U.S. Appl. No. 13/782,346, filed Mar. 1, 2013.
Official Communication issued in International Patent Application No. PCT/JP2012/053344, mailed on May 22, 2012.
Official Communication issued in International Patent Application No. PCT/JP2012/050557, mailed on Apr. 10, 2012.

(56) References Cited

OTHER PUBLICATIONS

Kimura et al.: "Wireless Communication Device"; U.S. Appl. No. 13/789,761, filed Mar. 8, 2013.
Dokai et al.: "RFID Chip Package and RFID Tag"; U.S. Appl. No. 13/792,650, filed Mar. 11, 2013.
Kato et al.: "Wireless IC Device Component and Wireless IC Device"; U.S. Appl. No. 13/794,929, filed Mar. 12, 2013.
Kato et al.: "Wireless IC Device and Component for Wireless IC Device"; U.S. Appl. No. 13/848,748, filed Mar. 22, 2013.
Official Communication issued in International Patent Application No. PCT/JP2012/080493, mailed on Dec. 25, 2012.
Mukai et al.: "Inspection Method and Inspection Device for RFID Tag"; U.S. Appl. No. 13/933,184, filed Jul. 2, 2013.
Kato et al.: "Antenna Device and Method of Setting Resonant Frequency of Antenna Device"; U.S. Appl. No. 13/941,760, filed Jul. 15, 2013.
Kato et al.: "Antenna Device and Method of Setting Resonant Frequency of Antenna Device"; U.S. Appl. No. 13/943,973, filed Jul. 17, 2013.
Official Communication issued in International Patent Application No. PCT/JP2012/080700, mailed on Jan. 15, 2013.
Mukai et al.: "Wireless Integrated Circuit Device and Method of Manufacturing the Same"; U.S. Appl. No. 13/961,995, filed Aug. 8, 2013.
Kato et al.: "Radio IC Device"; U.S. Appl. No. 13/964,234, filed Aug. 12, 2013.
Official Communication issued in International Patent Application No. PCT/JP2012/067779, mailed on Aug. 28, 2012.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/056812, mailed on Jul. 13, 2010.
Dokai et al.: "Optical Disc"; U.S. Appl. No. 13/295,153, filed Nov. 14, 2011.
Official Communication issued in International Patent Application No. PCT/JP2010/057668, mailed on Aug. 17, 2010.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010
Nomura et al.: "Antenna and Wireless IC Device"; U.S. Appl. No. 13/419,454, filed Mar. 14, 2012.
Official Communication issued in International Patent Application No. PCT/JP2010/070607, mailed on Feb. 15, 2011.
ITO: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.
Official Communication issued in International Patent Application No. PCT/JP2010/069416, mailed on Feb. 8, 2011.
Kato et al.: "Wireless Communication Device and Metal Article"; U.S. Appl. No. 13/429,465; filed Mar. 26, 2012.
Official Communication issued in International Patent Application No. PCT/JP2011/055344, mailed on Jun. 14, 2011.
Kubo et al.: "Antenna and Mobile Terminal"; U.S. Appl. No. 13/452,972, filed Apr. 23, 2012.
Ikemoto: "RFID System"; U.S. Appl. No. 13/457,525, filed Apr. 27, 2012.
Ikemoto et al.: "Wireless IC Device and Electronic Apparatus"; U.S. Appl. No. 13/468,058, filed May 10, 2012.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material with Electromagnetic Coupling Module,"; U.S. Appl. No. 12/536,663, filed Aug. 6, 2009.
Osamura et al.: "Packaging Material with Electromagnetic Coupling Module,"; U.S. Appl. No. 12/536,669, filed Aug. 6, 2009.

(56) References Cited

OTHER PUBLICATIONS

Dokai et al.: "Wireless IC Device and Component for Wireless IC Device,"; U.S. Appl. No. 12/543,553, filed Aug. 19, 2009.
Shioya et al.: "Wireless IC Device,"; U.S. Appl. No. 12/551,037, filed Aug. 31, 2009.
Ikemoto: "Wireless IC Device and Manufacturing Method Thereof,"; U.S. Appl. No. 12/579,672, filed Oct. 15, 2009.
Official communication issued in International Application No. PCT/JP2008/058614, mailed on Jun. 10, 2008.
Official Communication issued in International Patent Application No. PCT/JP2010/066291, mailed on Dec. 28, 2010.
Ikemoto: "Communication Terminal and Information Processing System"; U.S. Appl. No. 13/432,002, filed Mar. 28, 2012.
Official Communication issued in International Patent Application No. PCT/JP2010/070767, mailed on Feb. 22, 2011.
Ieki et al.: "Transceiver and Radio Frequency Identification Tag Reader"; U.S. Appl. No. 13/437,978, filed Apr. 3, 2012.
Official Communication issued in International Patent Application No. PCT/JP2011/065431, mailed on Oct. 18, 2011.
Kato et al.: "Wireless IC Device"; U.S. Appl. No. 13/470,486, filed May 14, 2012.
Kato: "Wireless IC Device"; U.S. Appl. No. 12/789,610, filed May 28, 2010.
Kato: "Antenna and RFID Device"; U.S. Appl. No. 13/472,520, filed May 16, 2012.
Kato et al.: "Wireless IC Device and Component for Wireless IC Device"; U.S. Appl. No. 13/540,694, filed Jul. 3, 2012.
Dokai et al.: "Wireless IC Device and Component for Wireless IC Device"; U.S. Appl. No. 13/567,108, filed Aug. 6, 2012.
Dokai et al.: "Wireless IC Device and Component for Wireless IC Device"; U.S. Appl. No. 13/567,109, filed Aug. 6, 2012.
Official Communication issued in International Patent Application No. PCT/JP2011/052594, mailed on May 17, 2011.
Kato et al.: "Wireless IC Device"; U.S. Appl. No. 13/585,866, filed Aug. 15, 2012.
Kato et al.: "Radio Communication Device and Radio Communication Terminal"; U.S. Appl. No. 13/600,256, filed Aug. 31, 2012.
Murayama et al.: "Wireless Communication Module and Wireless Communication Device"; U.S. Appl. No. 13/598,872, filed Aug. 30, 2012.
Official Communication issued in International Patent Application No. PCT/JP2011/069689, mailed on Oct. 4, 2011.
Official Communication issued in corresponding Japanese Patent Application No. 2011-552116, mailed on Apr. 17, 2012.
Tsubaki et al.: "RFID Module and RFID Device"; U.S. Appl. No. 13/603,627, filed Sep. 5, 2012.
Kato et al.: "Antenna Device and Method of Setting Resonant Frequency of Antenna Device"; U.S. Appl. No. 13/604,807, filed Sep. 6, 2012.
Kato et al.: "Antenna Device and Method of Setting Resonant Frequency of Antenna Device"; U.S. Appl. No. 13/604,801, filed Sep. 6, 2012.
Official Communication issued in International Patent Application No. PCT/JP2011/053656, mailed on May 17, 2011.
Official Communication issued in corresponding European Patent Application No. 09843679.3, mailed on Nov. 7, 2013.
Official Communication issued in corresponding Japanese Patent Application No. 2011-232369, mailed on Aug. 20, 2013.
Official Communication issued in corresponding European Patent Application No. 12188215.3, mailed on Apr. 11, 2014.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444; filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 077706650.4, mailed on Nov. 24, 2008.
Mukku-Sha, "Musen IC Tagu Katsuyo-no Subete" "(All About Wireless IC Tags")", RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399, mailed on Aug. 25, 2008.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device,"; U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device,"; U.S. Appl. No. 12/861,945, filed Aug. 24, 2010.
Kato: "Wireless IC Device and Electromagnetic Coupling Module,"; U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device"; U.S. Appl. No. 12/902,174, filed Oct. 12, 2010.

(56) References Cited

OTHER PUBLICATIONS

Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.

* cited by examiner

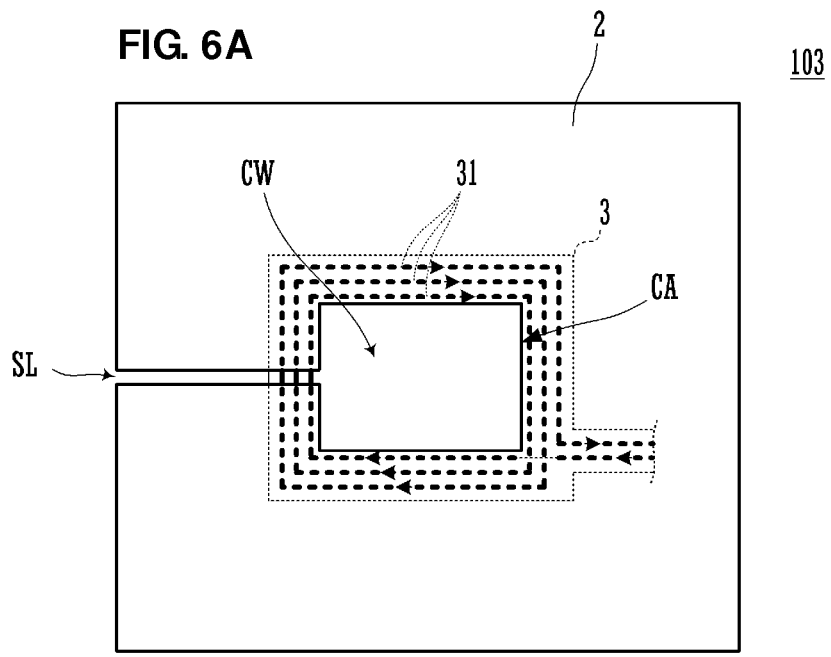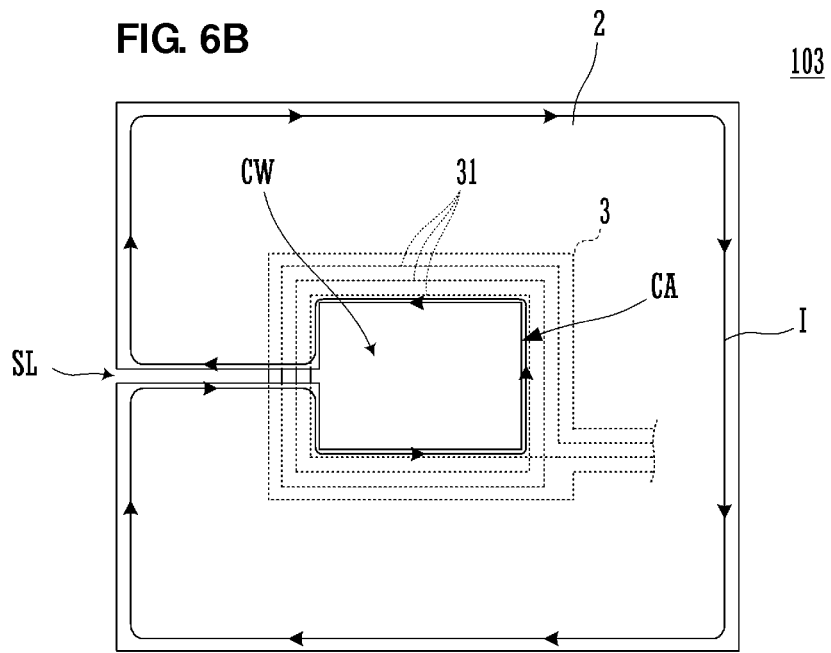

ANTENNA DEVICE AND METHOD OF SETTING RESONANT FREQUENCY OF ANTENNA DEVICE

BACKGROUND OF THE INVENTION

1. Field of the Invention

The present invention relates to antenna devices preferably for use in RFID systems and short-range wireless communication systems, such systems performing communication through electromagnetic signals with appliances that are communication partners, and also relates to methods of setting the resonant frequency of such antenna devices.

2. Description of the Related Art

In RFID systems and short-range wireless communication systems, which have become widely used in recent years, in order to facilitate communication between mobile electronic appliances such as mobile telephones or between a mobile electronic appliance and a reader/writer, a communication antenna is mounted in each of the appliances. Among such antennas, an antenna to be mounted in a mobile electronic appliance is disclosed in Japanese Unexamined Patent Application Publication No. 2006-270681.

FIG. 1 is a view illustrating communication between a mobile information terminal 21 and a reader/writer as disclosed in Japanese Unexamined Patent Application Publication No. 2006-270681 when the mobile information terminal 21 and the reader/writer are in the vicinity of each other. In the example illustrated in FIG. 1, a magnetic field H, which is part of the electromagnetic waves radiated from a transmitting/receiving antenna unit 26 of the reader/writer, is affected by metal objects such as a battery pack 25 within a main body 22 of the terminal and is weakened due to reflection, absorption and the like. A metal layer 30 is arranged closer to a side onto which the electromagnetic waves are incident than a location of a communication surface CS of an antenna module 10. An induced current (eddy current) is generated due to the external magnetic field acting on the front surface of the metal layer 30 and a magnetic field H1 generated as a result of this current causes generation of an induced electric current in an antenna coil 15 of the antenna module 10.

In this example, the metal layer 30 is arranged close to and facing the antenna module 10 so as to cover part of the antenna coil 15 and thereby inductive coupling occurs between the transmitting/receiving antenna unit 26 of the reader/writer and the antenna coil 15 of the antenna module 10 via the magnetic field component H1 that arises around the metal layer 30.

The antenna device illustrated in FIG. 1 attempts to solve a problem in that when the antenna of the antenna device and the antenna on the communication partner side are brought close to each other and the distance therebetween becomes very small, the communication characteristics fluctuate greatly depending on the magnitude of positional displacement between the centers of the two antenna. In order to reduce the degree to which magnetic flux, which is attempting to link the antenna coil 15 of the antenna module 10 on the mobile information terminal 21 side and transmitting/receiving antenna unit 26 on the reader/writer side, is blocked by metal objects such as the battery pack 25 within the casing, the metal layer 30 is provided to induce magnetic flux in that region. Therefore, a substantial effect cannot be regularly or reliably obtained by changing the positions of shielding members such as the battery pack 25.

Furthermore, the metal layer 30 effectively does not regularly or reliably increase the communication range in a state in which the antenna device and the antenna on the communication partner side are spaced apart from each other.

SUMMARY OF THE INVENTION

Accordingly, preferred embodiments of the present invention provide an antenna device that, even when the size of the antenna device is small compared to that of an antenna on the communication-partner side, is capable of stable communication and is also capable of increasing the maximum possible communication range, and also provide a method of adjusting the central resonant frequency of the antenna device.

An antenna device according to a preferred embodiment of the present invention is provided in an electronic appliance and includes a coil conductor having a loop shape or a spiral shape in which a winding center portion provides a coil opening; and a conductor layer that is arranged on a side closer to an antenna on a communication partner side than a location of the coil conductor; wherein the conductor layer includes a conductor opening and a slit, the slit connecting the conductor opening and an outer edge of the conductor layer; and when the substrate is viewed in plan view, the coil conductor and conductor layer are superposed one on top of the other.

A method of setting a resonant frequency of an antenna device according to another preferred embodiment of the present invention includes the steps of mounting inside a casing of an electronic appliance an antenna coil module that is formed by stacking a substrate on which a loop-shaped or spiral-shaped coil conductor, in which a winding center portion defines a coil opening, has been formed, on a magnetic sheet, arranging a conductor layer in the casing on a side that is closer to an antenna of a communication partner side than a location of the coil conductor; and forming a conductor opening and a slit in the conductor layer, the slit connecting the conductor opening and an outer edge of the conductor layer; wherein, when the substrate is viewed in plan view, the coil opening and the conductor opening at least partially overlap, and the resonant frequency is set to be lower than a central frequency of a to-be-used frequency band when the conductor layer is not present and is set to be the central frequency of the to-be-used frequency band when the antenna coil module has been mounted inside the casing of the electronic appliance.

According to various preferred embodiments of the present invention, a current flows through the conductor layer so that a magnetic field, which is generated by the current flowing through the coil conductor, is blocked. Then, a current flows around the periphery of the opening in the conductor layer and a current flows along the periphery of the slit and around the periphery of the conductor layer due to the cut-edge effect. As a result, a magnetic field arises around the conductor layer and the communication range can be increased.

In addition, since the conductor layer causes large loops of magnetic flux to circulate, the magnetic flux extends from the antenna device to the antenna on the communication partner side or from the antenna on the communication partner side to the antenna device, and the maximum possible range of communication between the antenna device and the antenna on the communication partner side becomes large.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 5A and 5B are views of an antenna device according to a second preferred embodiment of the present invention, wherein FIG. 5A is a plan view of the interior of a lower casing 1 of an electronic appliance, and FIG. 5B is a plan view of a state in which the antenna coil module 3 has been mounted on an inner surface of the lower casing 1.

FIGS. 6A and 6B are plan views of an antenna device 103 according to a third preferred embodiment of the present invention wherein FIG. 6A illustrates the current that flows through a coil conductor 31 and FIG. 6B illustrates a current l that flows through a conductor layer 2.

DETAILED DESCRIPTION OF THE PREFERRED EMBODIMENTS

First Preferred Embodiment

An antenna device and a method of setting a resonant frequency of the antenna device according to a first preferred embodiment of the present invention will be described with reference to FIGS. 2A to 4B.

Figure 1:
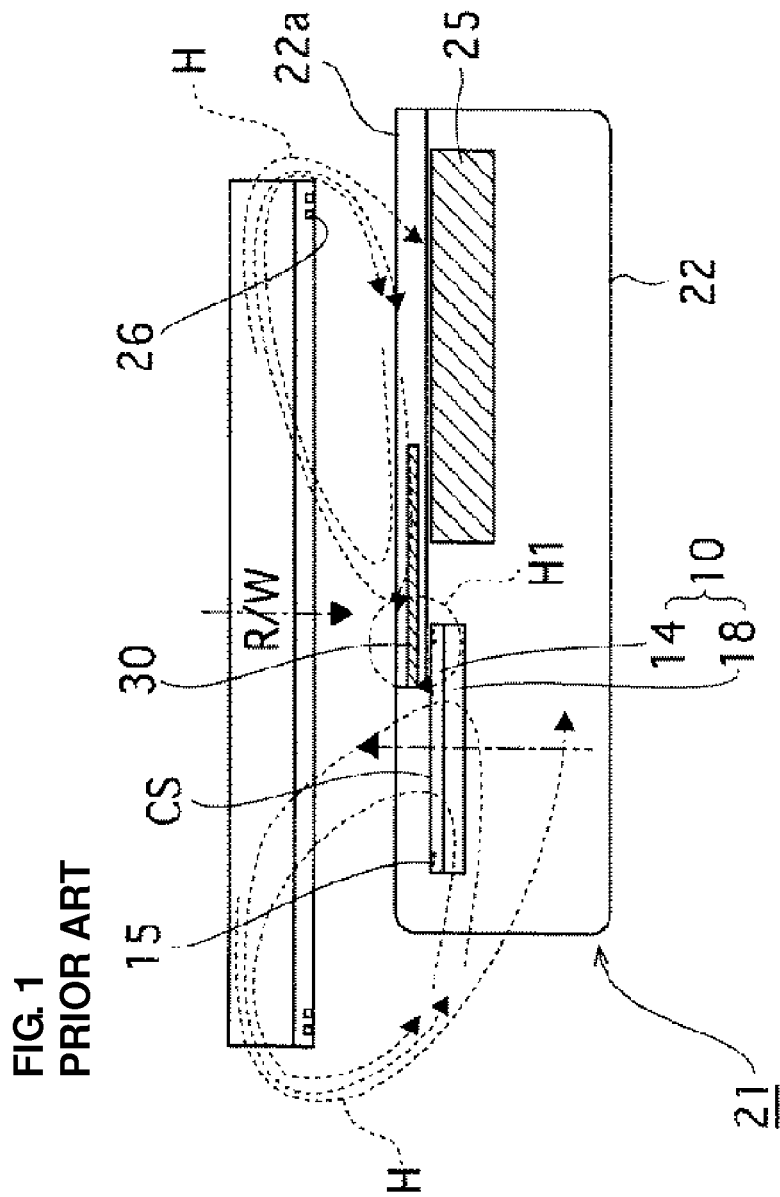
FIG. 1 is a view illustrating a situation in which communication is performed between the mobile information terminal 21 and the reader/writer as disclosed in Japanese Unexamined Patent Application Publication No. 2006-270681 when the mobile information terminal 21 and the reader/writer are in the vicinity of each other.
Figure 2A:
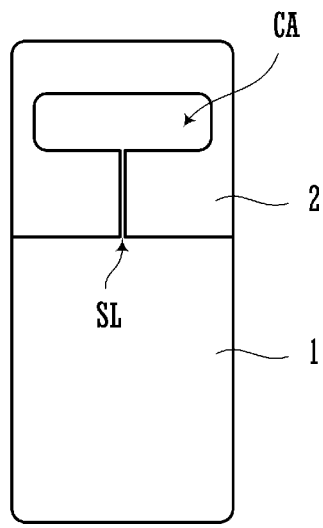
FIG. 2A is a view of a rear surface of an electronic appliance that is equipped with an antenna device according to a first preferred embodiment of the present invention.
Figure 2B:
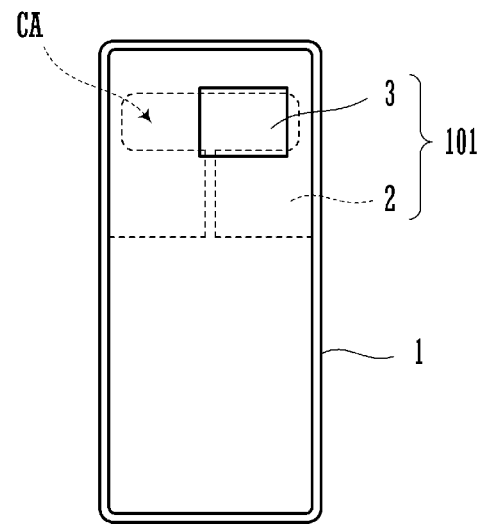
FIG. 2B is a plan view of the interior of a lower casing viewed from the rear surface side.

FIG. 2A is a view of a rear surface of an electronic appliance that is equipped with the antenna device according to the first preferred embodiment of the present invention. The rear surface of the electronic appliance faces an antenna on a reader/writer side, which is a communication partner side. FIG. 2B is a plan view of the interior of a lower casing on the rear surface side. Only the structures of principal components are illustrated in FIGS. 2A and 2B.

As illustrated in FIG. 2A, a conductor layer 2 is located on an outer surface of a lower casing 1. The conductor layer 2 is, for example, a vapor-deposited metal film such as an aluminum film. A conductor opening CA and a slit SL, which connects the conductor opening CA and an outer edge of the conductor layer 2, are provided in the conductor layer 2.

As illustrated in FIG. 2B, an antenna coil module 3 is arranged on an inner surface of the lower casing 1 so as to partially cover the conductor opening CA.

In this preferred embodiment, a camera module is to be installed in the conductor opening CA, for example. It is preferable for the lens of the camera module to be exposed to the outside through an opening in the casing. Therefore, by arranging the conductor opening so as to coincide with the opening provided in the casing in this way, there is no need to design a special casing taking into account provision of the conductor layer 2.

In addition, in cases such as where a portion of an outer surface of the casing is preferably metallic from a design point of view, a metal film is preferably formed on the outer surface of the casing by vapor deposition or other suitable process and the metal film may double as the conductor layer.

By forming the conductor layer 2 on an inner or outer surface of the casing of the electronic appliance in this way, there is no need to ensure there is a dedicated space in which to arrange the conductor layer 2 and a conductor layer 2 having a large area can be arranged.

Figure 3A:
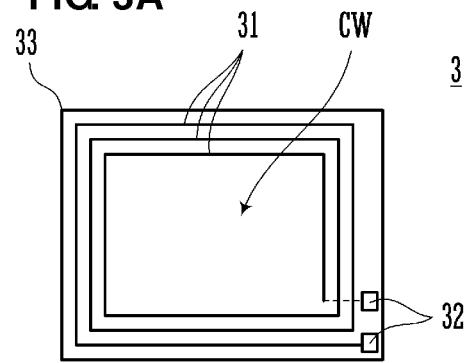
FIG. 3A is a plan view of the antenna coil module 3 and FIG. 3B is a front view thereof.
Figure 3B:
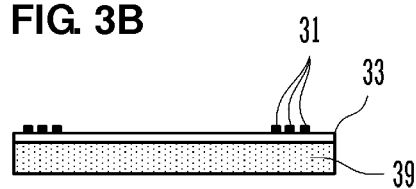

FIGS. 3A and 3B are a plan view and a front view of the antenna coil module 3, respectively. The antenna coil module 3 preferably includes a rectangular-sheet-shaped flexible substrate 33 and a magnetic sheet 39 having the same or substantially the same rectangular sheet-shaped configuration as the flexible substrate 33. Connectors 32 are provided on the flexible substrate 33 and are used to connect a spiral-shaped coil conductor 31, in which a winding center portion provides a coil opening CW, and an external circuit. The magnetic sheet 39 preferably is, for example, made of a ferrite formed in a sheet-shaped configuration.

The number of windings (number of turns) of the coil conductor 31 is determined on the basis of the required inductance. If there is only one turn, a simple loop-shaped coil conductor is formed.

The antenna coil module 3 is arranged so that the antenna coil module 3 is mounted on an inner surface of the lower casing 1 of the electronic appliance as illustrated in FIG. 2B, and when an upper casing is stacked thereon, the connectors 32 contact predetermined pins of a circuit board mounted in the upper casing.

The circuit board is provided with a capacitor that is connected in parallel with the connectors 32. The resonant frequency is determined by the inductance defined by the coil conductor 31 and the magnetic sheet 39 of the antenna coil module 3 and the capacitance of the capacitor. For example, in the case where a HF band is used having a central frequency of 13.56 MHz, the resonant frequency is determined to be 13.56 MHz.

Figure 4A:
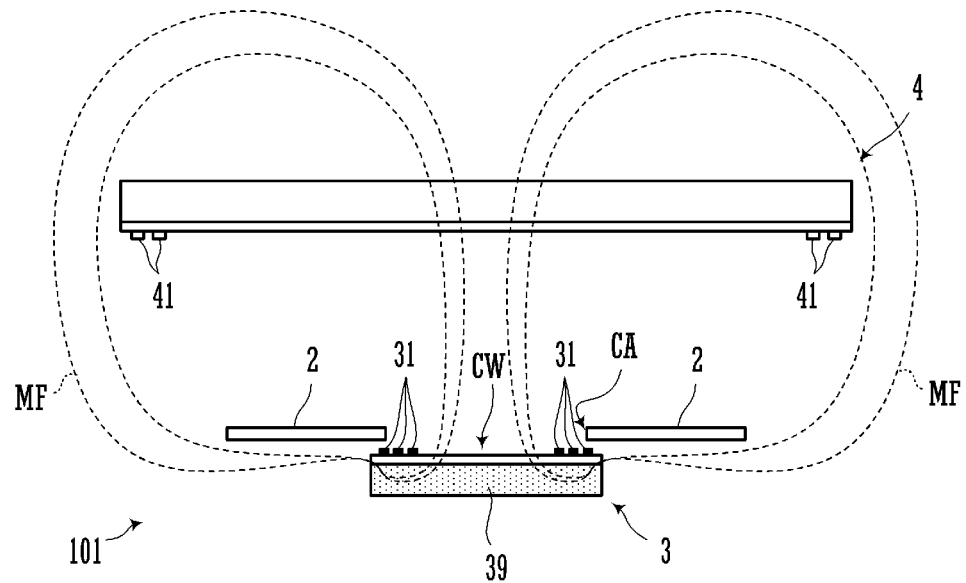
FIG. 4A is a sectional view illustrating a state in which the antenna device 101 and the antenna on the reader/writer side are magnetically coupled.
Figure 4B:
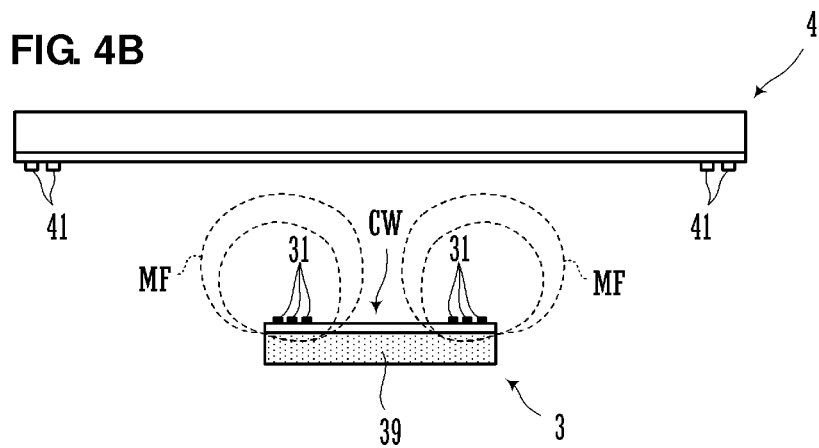
FIG. 4B is a sectional view illustrating a state in which there is no conductor layer 2, as a comparative example.

FIG. 4A is a sectional view illustrating a state in which the antenna device 101 and the antenna on the reader/writer side are magnetically coupled. Furthermore, FIG. 4B is a sectional view illustrating a state in which there is no conductor layer 2, as a comparative example. Components of the casing of the electronic appliance are omitted from the figures.

Since at least a portion of the coil conductor 31 of the antenna coil module 3 is covered by the conductor layer 2, a current flows through the conductor layer such that the magnetic field that arises due to the current flowing through the coil conductor is blocked. Then, a current, which flows around the periphery of the opening of the conductor layer, passes along the periphery of the slit and flows around the periphery of the conductor layer due to a cut-edge effect. In addition, a current also flows through the planar portion of the conductor layer. Accordingly, a magnetic field arises around the conductor layer and since magnetic flux does not penetrate through the conductor layer 2, magnetic flux MF attempts to bypass the conductor layer 2 along a path in which the conductor opening CA of the conductor layer 2 is on the inside and the outer edge of the conductor layer 2 is on the outside. As a result, the magnetic flux MF draws relatively large loops that link the inside and the outside of a coil conductor 41 of an antenna 4 on the reader/writer side. In other words, the antenna device 101 and the antenna 4 on the reader/writer side are magnetically coupled.

Furthermore, the magnetic flux, which is attempting to link the coil conductor 31 and the antenna on the communication partner side, can circulate through the coil opening CW and the conductor opening CA due to the fact that the coil opening CW and the conductor opening CA at least partially overlap when the coil conductor 31 is viewed in plan view. Specifically, when the coil opening CW and the conductor opening CA overlap over almost the entire peripheries thereof when the coil conductor 31 is viewed in plan view, the coil conductor 31 can be made to effectively radiate a magnetic field.

In addition, large magnetic field loops can be generated due to the fact that the area of the conductor layer 2 is larger than the area of the region over which the coil conductor 31 is formed.

Furthermore, the directivity of the antenna can be made to be wider in the antenna direction of the communication partner by stacking the magnetic sheet 39 on the surface of the flexible substrate 33 that is on the side farther from the antenna on the communication partner side.

In this way, since it turns out that the magnetic flux is oriented in directions that extend beyond the conductor layer 2, stable communication can be realized even when the antenna device 101 and the reader/writer are close to each other in a state where the center of the antenna device 101 (center of antenna coil module 3) and the center of the antenna 4 of the reader/writer are aligned.

Furthermore, since conductor loops are not formed in the conductor layer 2 because the conductor layer 2 is provided with the slit SL, as illustrated in FIG. 4A, when the magnetic flux MF circulates through the conductor opening CA and around the outer edge of the conductor layer 2, eddy currents can be prevented from arising in the conductor layer 2 and losses due to such eddy currents can be minimized and prevented. As a result, the maximum possible communication range can be secured between the antenna device 101 and the antenna 4 on the reader/writer side.

In contrast to this, as illustrated in FIG. 4B, when there is no conductor layer 2, the magnetic flux MF, which passes through the coil opening CW, does not spread out in the left-right direction in FIG. 4B (direction of spreading when the antenna module 3 is viewed in plan view) and the degree of coupling with the antenna 4 on the reader/writer side is small. Therefore, a phenomenon occurs in which communication becomes increasingly unstable the closer the antenna device 101 and the reader/writer are brought to each other.

Moreover, in the antenna device according to a preferred embodiment of the present invention, the conductor layer causes large loops of magnetic flux to circulate and therefore magnetic flux reaches from the antenna device to the antenna on the communication partner side or from the antenna on the communication partner side to the antenna device and the maximum possible range of communication between the antenna device and the antenna on the communication partner side becomes large.

The following table lists results obtained when the size of the antenna coil module 3 was varied and the range over which communication can be performed between an antenna device 101 equipped with each of the antenna coil modules 3 and the antenna on the communication partner side was measured.

| Size of Antenna Coil Module | Without Conductor Layer | With Conductor Layer |
| --- | --- | --- |
| 22.5 mm × 20 mm | 0-24 mm | 0-44 mm |
| 22.5 mm × 19 mm | 0-23 mm | 0-43 mm |
| 22.5 mm × 18 mm | 0-19 mm | 0-41 mm |
| 22.5 mm × 17 mm | — | 0-39 mm |
| 22.5 mm × 16 mm | — | 0-38 mm |

For example, in the case of the antenna device equipped with the antenna coil module 3 having a size of, for example, about 22.5 mm×about 18 mm, when the conductor layer is included, the maximum possible communication range is increased to about 41 mm, in contrast to when the conductor layer is not provided and the maximum communication range is about 19 mm. Furthermore, for example, in the case of the antenna devices equipped with the antenna coil modules 3 having sizes equal to or less than, for example, about 22.5 mm×about 17 mm, communication is not possible at any distance when the conductor layer is not provided. In contrast, when the conductor layer is included, communication is possible over a wide range from, for example, about 0 mm to about 38 mm even in cases where the antenna device is configured so as to be equipped with a very small antenna coil module 3 such as the one having a size of about 22.5 mm×about 16 mm, for example.

Setting of the central resonant frequency of the antenna device 101 is preferably performed as follows. In a state in which the antenna coil module 3 illustrated in FIG. 2B is not in the vicinity of the conductor layer 2, in other words, in a stand alone state in which the antenna coil module 3 has not yet been mounted in the lower casing 1, while the antenna coil module 3 is connected in parallel with a resonance capacitor, the resonant frequency is set in advance to be lower than the central resonant frequency of the frequency band to be used. As illustrated in FIGS. 2B and 4A, when the antenna coil module 3 is brought close to the conductor opening CA of the conductor layer 2, since the inductance value of the antenna coil module 3 becomes smaller, the resonant frequency of the antenna device 101 increases. Consequently, the inductance value of the antenna coil module 3 in the stand alone state is determined so that the resonant frequency of the antenna device 101 once the antenna device 101 has been constructed by mounting the antenna coil module 3 inside the casing of the electronic appliance approximately coincides with the central resonant frequency of the frequency band to be used.

In addition, the inductance of the antenna device varies in accordance with the length and width of the slit SL. For example, when the slit SL is made to be large, the degree of reduction of the inductance value (increase of resonant frequency) when the conductor layer 2 is brought close to the antenna coil module 3 can be suppressed. Accordingly, the length and width of the slit SL are set so as to obtain a desired inductance value.

Furthermore, since the inductance varies with the positional relationship between the antenna coil module 3 and the conductor layer 2 and with the shape and size of the conductor opening CA of the conductor layer 2, the positional relationship between the antenna coil module 3 and the conductor layer 2 and the shape and size of the conductor opening CA of the conductor layer 2 are set so as to obtain a desired inductance value.

In this way, since the loops of magnetic flux are large due to the presence of the conductor layer, the coil opening CW of the coil conductor 31 may be made small and the antenna coil module can be reduced in size. Furthermore, together with making the coil opening CW small, the number of coil turns can be increased and the number of values of the inductance of the antenna coil module that can be adopted can be increased. As a result, setting of the resonant frequency is simplified.

As described above, in a preferred embodiment of the present invention, characteristics are used for which a magnetic field cannot penetrate into the conductor layer and the emission pattern of the magnetic field at the frequency being used is caused to change due to the presence of the conductor layer.

Stable communication can be performed with the antenna device 101 according to a preferred embodiment of the present invention, even when there are various sizes of the antenna device 101 and the antenna 4 on the reader/writer side. In other words, in the case where the antenna 4 on the reader/writer side is large, magnetic flux circulates in large loops due to the presence of the conductor layer 2 and the magnetic flux from the antenna device 101 reaches the antenna 101 on the reader/writer side, and in the case in which the antenna 4 on the reader/writer side is small, the distance that the magnetic flux reaches is increased due to the presence of the conductor layer 2.

Second Preferred Embodiment

Figure 5A:
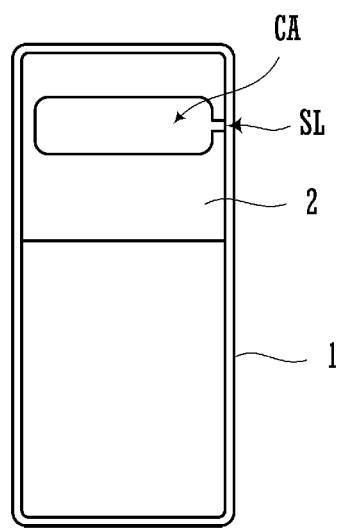
Figure 5B:
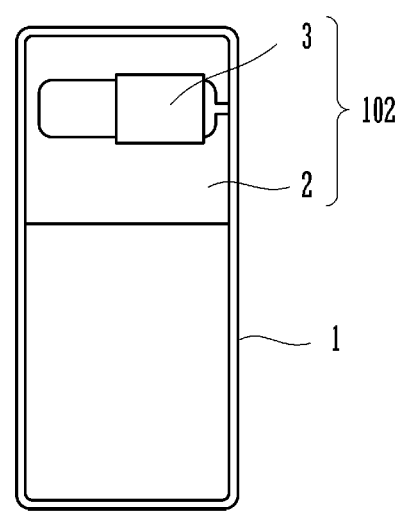

FIGS. 5A and 5B are views of an antenna device 102 according to a second preferred embodiment of the present invention. FIG. 5A is a plan view from the inner surface side of the lower casing 1 of the electronic appliance. Furthermore, FIG. 5B is a plan view of a state in which the antenna coil module 3 has been mounted on an inner surface of the lower casing 1.

In the second preferred embodiment, the conductor layer 2 is preferably provided on an inner surface of the lower casing 1. The conductor layer 2 is preferably formed by vapor deposition of a metal film such as aluminum or by adhesion of a metal foil, for example. In this way, a conductor layer may be provided on an inner surface of the casing.

Moreover, in the preferred embodiment illustrated in FIGS. 5A and 5B, the slit SL of the conductor layer 2 is provided in a portion for which the distance from the conductor opening CA to the edge is short.

The conductor layer 2 may be connected to the ground of a circuit inside the electronic appliance. By doing this, the conductor layer 2 can also serve as a conductor layer to shield the electronic appliance.

Third Preferred Embodiment

FIGS. 6A and 6B are plan views of an antenna device 103 according to a third preferred embodiment of the present invention. FIG. 6A illustrates an electric current that flows through the coil conductor 31 and FIG. 6B illustrates an electric current I that flows through the conductor layer 2. The antenna device 103 preferably includes the antenna coil module 3 and the conductor layer 2. The antenna coil module 3 is preferably constructed by stacking the flexible substrate on which the spiral-shaped coil conductor 31 has been formed on top of a magnetic sheet. Basically, this is the same as the configuration illustrated in FIGS. 3A and 3B. However, in this preferred embodiment, the two terminals of the coil conductor extend from the flexible substrate and connectors are provided at positions separated from the coil conductor 31.

The conductor layer 2 preferably includes the conductor opening CA and the slit SL, which connects the conductor opening CA and the outer edge of the conductor layer 2.

When the coil conductor 31 and the conductor layer 2 are viewed in plan view, the coil opening CW and the conductor opening CA are aligned and overlap over almost the entire peripheries thereof. With such a configuration, when the coil conductor 31 is viewed in plan view, the entirety of the coil conductor 31 can be covered by the conductor layer 2. Consequently, since the magnetic flux generated by the coil conductor 31 attempts to totally link to the conductor layer 2, a large current is generated in the conductor layer 2 in a direction opposite to that of the current that flows through the coil conductor 31 so as to block this magnetic flux. The large electric current I, which flows around the periphery of the conductor opening CA, flows along the periphery of the slit SL, through the plane of the conductor layer and along the periphery of the conductor layer due to the cut-edge effect. Accordingly, a strong magnetic field can be generated by the conductor layer and the communication range can be further widened. In addition, the loops of magnetic flux passing through the conductor opening CA and the coil opening CW and circulating around the conductor layer 2 are more effectively widened. Consequently, stable communication can be performed even when the electronic appliance equipped with the antenna device 103 is oriented in any direction among in-plane directions relative to the surface of the antenna on the reader/writer side.

Fourth Preferred Embodiment

Figure 7A:
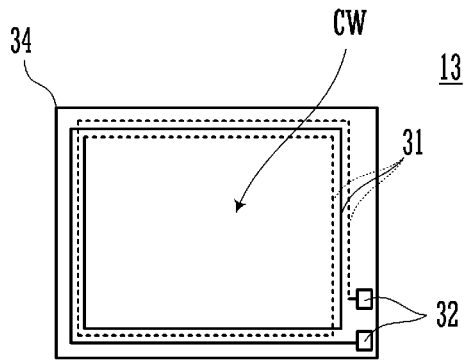
FIG. 7A is a plan view of an antenna coil module 13 according to a fourth preferred embodiment of the present invention and FIG. 7B is a front view thereof.
Figure 7B:
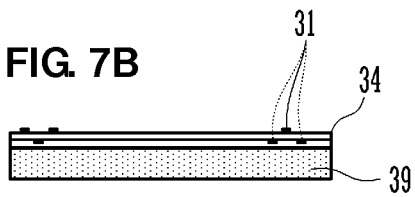

FIG. 7A and FIG. 7B are a plan view and a front view of an antenna coil module 13 according to a fourth preferred embodiment, respectively. The antenna coil module 13 is positioned so as to be in the vicinity of a conductor layer, as illustrated in FIGS. 2A and 2B, similarly to the case of the first preferred embodiment. Due to the antenna coil module 13 being positioned in this way, a large electric current is generated in the conductor layer 2 and a strong magnetic field is generated around the conductor layer 2.

The antenna coil module 13 preferably includes the rectangular-plate-shaped flexible substrate 34 and the magnetic sheet 39 having the same rectangular shape. The spiral-shaped coil conductor 31, in which a winding center portion defines the coil opening CW, and connectors 32, which are used to connect to an external circuit, are provided on the flexible substrate 34. The coil conductor 31 is preferably arranged over two layers of the flexible substrate 34. The two layers are connected by via conductors. The magnetic sheet 39 preferably is, for example, composed of a ferrite formed in a sheet-shaped configuration.

In this way, a strong magnetic field is generated by the coil conductor due to the coil conductor 31 being wound over a plurality of layers, and as a result, a large current is made to flow in the conductor layer. In addition, the coil conductor can be centered and arranged so as to be aligned with the inner edge of the conductor opening. Accordingly, magnetic flux, which is centered on and generated by the coil conductor 31 attempts to link to the conductor layer and therefore a large current can be made to flow in the conductor layer.

Fifth Preferred Embodiment

Figure 8:
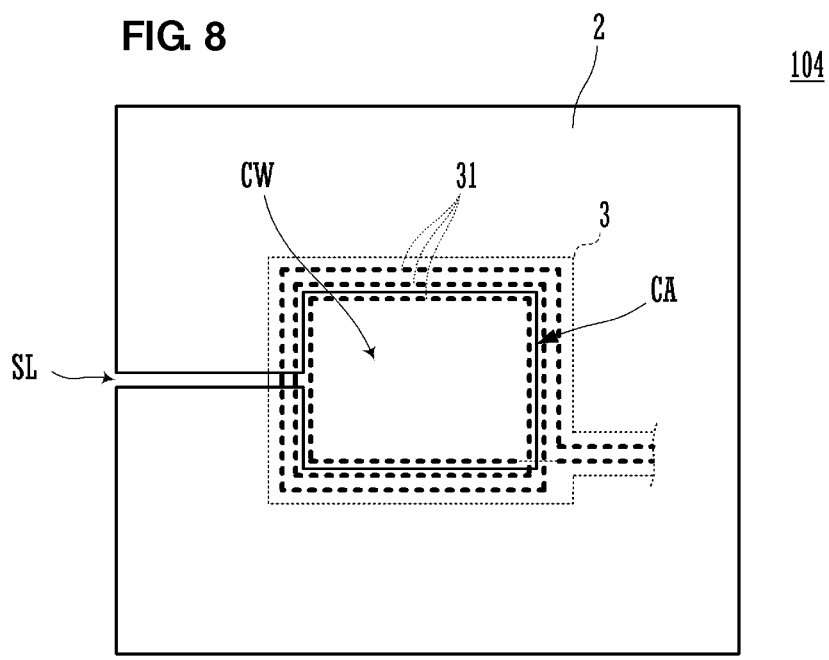
FIG. 8 is a plan view of an antenna device 104 according to a fifth preferred embodiment of the present invention.

FIG. 8 is a plan view of an antenna device 104 according to a fifth preferred embodiment of the present invention. The antenna device 104 preferably includes the antenna coil module 3 and the conductor layer 2. In the antenna coil module 3, a flexible substrate on which a spiral-shaped coil conductor has been formed is stacked on top of a magnetic sheet. This configuration is similar to that illustrated in FIGS. 6A and 6B. However, in this preferred embodiment, the coil opening CW is preferably slightly smaller than the conductor opening CA.

Since a portion of the coil conductor 31 is covered by the conductor layer 2, a current flows through the conductor layer 2 due to the magnetic flux generated by the coil conductor 31 as a result of this structure.

In addition, in each of the above-described preferred embodiments, the conductor layer is preferably provided on an outer surface or an inner surface of the casing, but the conductor layer may be arranged on an internal component of the casing. Furthermore, in the case where the casing itself is metal, the casing may be used as the conductor layer.

In addition, in each of the above-described preferred embodiments, the antenna coil module 3 is preferably constructed by stacking the flexible substrate 33 equipped with the coil conductor 31 on top of the magnetic sheet 39 composed of a ferrite; however, it may not be necessary to provide a magnetic sheet in an environment where there is no adverse influence on formation of loops of magnetic flux at the rear surface of the antenna coil module 3.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic appliance comprising:
    a casing;
    an antenna device disposed in the casing, the antenna device including:
        a coil conductor having a loop shape or a spiral shape in which a winding center portion defines a coil opening; and
        a conductor layer; wherein
    the conductor layer includes a conductor opening and a slit, the slit connecting the conductor opening and an outer edge of the conductor layer;
    when the coil conductor is viewed in plan view, at least a portion of the coil conductor overlaps with the conductor layer;
    the conductor layer is arranged to function as a radiator to radiate a magnetic field; and
    the electronic appliance is configured such that the magnetic field is radiated towards an outside of the casing and communication between the antenna device and a communication partner is performed with the communication partner being disposed outside of the casing;
    the communication between the antenna device and the communication partner is performed using inductive coupling;
    the conductor layer is located on an inner surface, on an outer surface, or on an internal component of the casing of the electronic appliance; and
    an end portion of the coil opening at least partially overlaps with the conductor layer when viewed in plan view.

2. The electronic appliance according to claim 1, wherein the slit in the conductor layer is provided in a portion of the conductor layer at which a distance from the conductor opening to the edge surface of the casing is less than half of a length or width of the casing.

3. The electronic appliance according to claim 1, wherein the slit in the conductor layer is provided in a portion of the conductor layer which is adjacent to the edge surface of the casing.

4. The electronic appliance according to claim 1, wherein the conductor layer is larger than an area of a region in which the coil conductor is located.

5. The electronic appliance according to claim 1, wherein the coil conductor is wound across a plurality of layers.

6. The electronic appliance according to claim 1, wherein, when the coil conductor is viewed in plan view, the coil opening and the conductor opening overlap each other over almost entire peripheries thereof.

7. The electronic appliance according to claim 1, wherein the coil conductor is located on a substrate, a magnetic sheet is stacked on a surface of the substrate on a side that is spaced from the antenna on the communication partner side, and an antenna coil module includes the substrate and the magnetic sheet.

8. The electronic appliance according to claim 1, wherein a resonant frequency of the antenna device is lower than a central frequency of a to-be-used frequency band in a state in which the conductor layer is not present and is equal or substantially equal to the central frequency of the to-be-used frequency band in a state in which the antenna coil module has been mounted inside the casing of the electronic appliance.

9. The electronic appliance according to claim 1, wherein the communication partner is a reader/writer.

10. The electronic appliance according to claim 1, further comprising a magnetic layer.

11. The electronic appliance according to claim 1, wherein the communication between the antenna device and the communication partner is performed in the HF frequency band.

12. The electronic appliance according to claim 2, wherein an area of the conductor layer is larger than an area of a region in which the coil conductor is disposed.

13. The electronic appliance according to claim 1, further comprising a magnetic layer arranged on a side farther from an antenna on a communication partner side than the coil conductor is relative to the antenna on the communication partner side.

14. The electronic appliance according to claim 13, wherein when the conductor layer is viewed in plan view, an outer peripheral edge of the magnetic layer is located inside of an outer peripheral edge of the conductor layer.

15. An electronic appliance comprising:
    a metal casing;
    an antenna device disposed in the casing, the antenna device including:
        a coil conductor having a loop shape or a spiral shape in which a winding center portion defines a coil opening; and a conductor layer; wherein the conductor layer includes a conductor opening and a slit, the slit connecting the conductor opening and an outer edge of the conductor layer;

when the coil conductor is viewed in plan view, at least a portion of the coil conductor overlaps with the conductor layer;

the conductor layer is arranged to function as a radiator to radiate a magnetic field; and the electronic appliance is configured such that the magnetic field is radiated towards an outside of the casing and communication between the antenna device and a communication partner is performed with the communication partner being disposed outside of the casing;

the communication between the antenna device and the communication partner is performed using inductive coupling;

the conductor layer is defined by at least a portion of the metal casing of the electronic appliance; and an end portion of the coil opening at least partially overlaps with the conductor layer when viewed in plan view.

\* \* \* \* \*